United States Patent [19]

DiSanto et al.

[11] Patent Number: 5,279,511
[45] Date of Patent: Jan. 18, 1994

[54] METHOD OF FILLING AN ELECTROPHORETIC DISPLAY

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 964,350

[22] Filed: Oct. 21, 1992

[51] Int. Cl.$^5$ ............................................. C25D 13/00
[52] U.S. Cl. .................................. 445/24; 204/181.6; 204/181.7; 204/299 EC
[58] Field of Search ....................... 445/24; 204/181.7, 181.6, 204/300 PE, 299 PE, 299 EC

[56] References Cited

U.S. PATENT DOCUMENTS

| | | | |
|---|---|---|---|
| 2,442,863 | 6/1948 | Schneider | 204/181.7 |
| 3,540,990 | 11/1970 | Onishi et al. | 204/181.7 |
| 3,756,693 | 9/1973 | Ota | 204/299 PE |
| 4,305,807 | 12/1981 | Somlyody | 204/299 EC |
| 4,482,447 | 11/1984 | Mizuguchi et al. | 204/181.6 |

*Primary Examiner*—Mark Rosenbaum
*Assistant Examiner*—Jeffrey T. Knapp
*Attorney, Agent, or Firm*—Arthur L. Plevy

[57] ABSTRACT

The present invention is a method of filling the interstice between the anode structure and the cathode structure of an electrophoretic image display (EPID) with a fluid dispersion containing solid pigment particles. And more specifically, a method of filling such EPIDs when the interstice between the anode structure and the cathode structure is less than 0.007 inches. The present invention method includes the steps of coating the anode structure with pigment particles prior to the assembly of the anode structure or cathode structure into the EPID. After the pigment particle coated anode or cathode structure has been assembled into the EPID, the EPID is filled with a suspension medium lacking any pigment particles. An electrophoretic effect is then created within the EPID causing the pigment particles to migrate away from the anode or cathode structure they coat, thereby becoming disperse within the suspension medium.

20 Claims, 5 Drawing Sheets

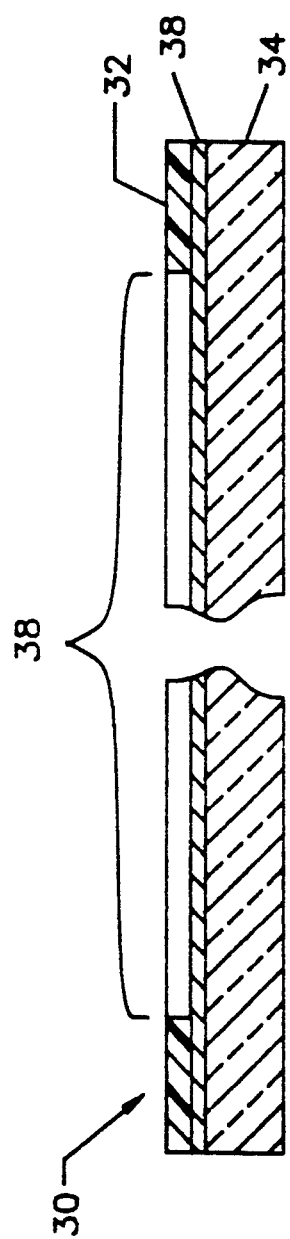

METHOD OF FILLING AN ELECTROPHORETIC DISPLAY

FIELD OF THE INVENTION

The present invention relates to methods of filling electrophoretic image displays with a dispersion of dielectric pigment particles suspended within a suspension medium, and more particularly to such filling methods for filling electrophoretic panels having extremely small spacings or interstices between the anode structure and cathode structure.

BACKGROUND OF THE INVENTION

The electrophoretic effect is well known and the prior art is replete with a number of patents and articles which use and describe the effect. See for example, U.S. Pat. No. 5,077,157 issued on Dec. 31, 1991 and entitled Methods of Fabricating Dual Anode Flat Panel Electrophoretic Displays. See U.S. Pat. No. 4,850,919 entitled Monolithic Flat Panel Display Apparatus and Methods for Fabrication Thereof issued on Jul. 25, 1989, see U.S. Pat. No. 5,505,763 entitled Dual Anode Flat Panel Electrophoretic Display Apparatus, issued on Oct. 1, 1991. The above patents are all assigned to CopyTele, Inc., the assignee herein with Frank J. DiSanto and Denis A. Krusos, the named inventor and the inventors herein. As will be recognized by a person skilled in the art, the electrophoretic effect operates on the principle that pigment particles, when suspended in a medium, can be electrically charged and thereby caused to migrate through the medium to an electrode of opposite charge. Electrophoretic image displays (EPID) utilize the electrophoretic effect to produce desired images. In a EPID, colored dielectric particles are suspended in a fluid medium of an optically contrasting color. The colored electrophoretic particles are then caused to selectively migrate against a transparent screen, thereby displacing the fluid medium against the screen and creating the desired image.

In a conventional EPID, a volume of an electrophoretic dispersion is encapsulated in between an anode structure and a cathode structure. Conventionally to create an image in an EPID, the dielectric pigment particles in the dispersion are caused to migrate toward the cathode structure. The cathode structure is transparent, consequently as the pigment particles displace the suspension fluid against the cathode structure, the desired image can be formed. The response time of an EPID is dependent upon the time it takes the pigment particles to migrate through the suspension medium and reach the cathode structure. Consequently, in an attempt to create more efficient EPIDs, EPIDs have been formed having very small interstices in between the anode structure and the cathode structure. Such constructions therefore lessen the distance the pigment particles must migrate and consequently effect the response time capabilities of the EPIDs.

A problem with EPIDs having small spacings between their anode and cathode structures, is how to fill the EPIDs with the needed pigment particles and suspension fluid. In EPIDs having a spacing of 0.007 inches or more between its anode and cathode structures, the EPID is filled by introducing a dispersion of pigment particles and suspension fluid into the EPID chamber with a pipette filler or similar device. However, with EPIDs having a fluid chamber with a spacing of less than 0.007 inches, pipette filling techniques are not as effective. With spacings of less than 0.007 inches, the suspension fluid readily enters the fluid chamber. However, due to their size and bulk, the pigment particles accumulate near or at the entrance of the chamber. For EPIDs having spacing of less than 0.003 inches, the pigment particles become trapped at the point of insertion and fail to flow altogether. Consequently, the design of narrow chambered EPIDs is become limited by a manufacturers ability to fill EPIDs with dispersions, thereby hindering advancements in EPID technologies available through EPIDs having an interstice spacing of less than 0.007 inches.

It is, therefore, a primary objective of the present invention to provide a method of filling EPIDs having an interstice spacing of less than 0.007 inches with a proper dispersion of pigment particles and suspension fluid.

SUMMARY OF THE INVENTION

The present invention is a method of filling the interstice between the anode and cathode structure of an electrophoretic image display (EPID) with a fluid dispersion containing solid pigment particles. And more specifically, a method of filling such EPIDs when the interstice between the anode structure and the cathode structure is less than typically about 0.007 inches. The present invention method includes the steps of coating the anode structure or cathode structure of an EPID with pigment particles prior to the assembly of the anode structure or cathode structure into the EPID. After the pigment particle coated anode or cathode structure has been assembled into the EPID, the EPID is filled with a suspension medium lacking any pigment particles. An electrophoretic effect is then created within the EPID causing the pigment particles to migrate away from the anode or cathode structure they coat, to disperse within the suspension medium.

In the preferred embodiment the anode structure or cathode structure are initially coated with the pigment particles by utilizing the anode structure or cathode structure as an electrode in a fluid reservoir containing a dispersion of the pigment particles. An initial electrophoretic effect is created in the reservoir by applying an electric potential to the anode or cathode structure and an opposing electrode. The electrophoretic effect created causes the pigment particles contained within the dispersion to migrate toward, and coat the anode or cathode structure.

Once fully coated, the electrical potential is removed and the pigment particle coating dried. The coated anode or cathode structure is then fabricated to form an EPID where the coating is removed by a reversed electrophoretic effect.

BRIEF DESCRIPTION OF THE DRAWINGS

For a better understanding of the present invention, reference is made to the following description of an exemplary embodiment thereof, considered in conjunction with the accompanying drawings, in which:

FIG. 2B is a cross-sectional view of the embodiment of the fixture illustrated in FIG. 2A, view along section line 2B—2B;

DETAILED DESCRIPTION OF THE DRAWINGS

Figure 1:
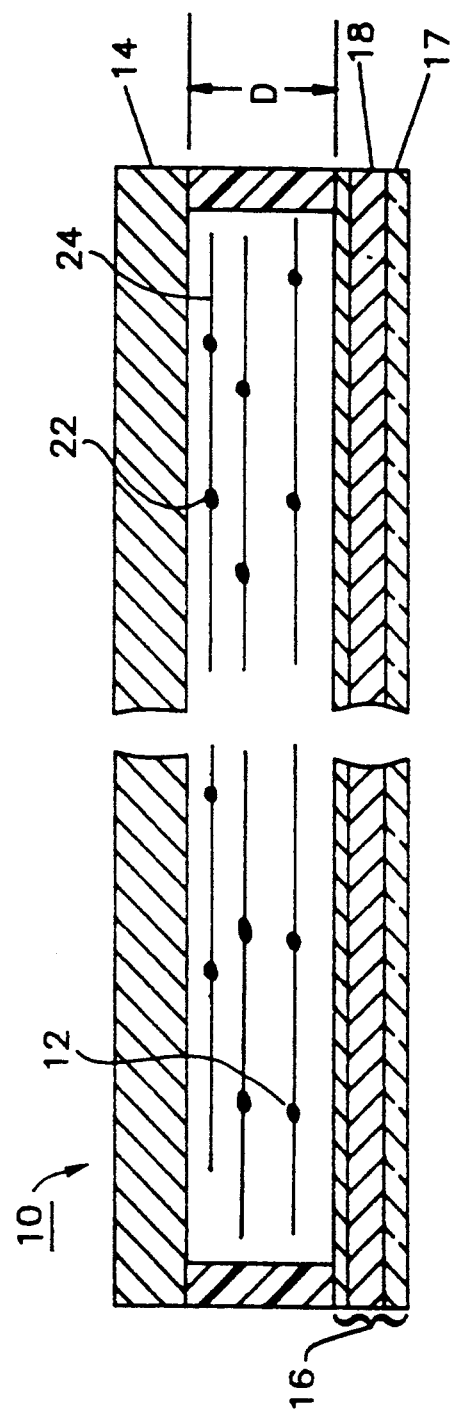
FIG. 1 is a cross-sectional view of a conventional electrophoretic image display.

Referring to FIG. 1, there is shown a cross section of a conventional Electrophoretic Image Display (EPID) 10. As will be recognized by a person skilled in the art, an EPID 10 contains a volume of an electrophoretic dispersion 12 encapsulated between an anode structure 14 and a cathode structure 16. The cathode structure 16 is comprised of a glass plate 17 on which is deposited a thin layer 18 of indium-tin-oxide (ITO) or a like compound. The ITO layer 18 is deposited in such a manner so as to be substantially transparent when viewed through the glass plate 17. A cathode grid 20 is etched onto the ITO layer 18 in a grid-like pattern, providing the configuration needed to selectively create images whereby the spacing of the cathode grid 20 controls the resolution of any viewed image.

The electrophoretic dispersion 12 is comprised of dielectric pigment particles 22 suspended in a suspension fluid 24 of a contrasting color. The volume of the electrophoretic dispersion 12 contained by the EPID 10 is contained within the interstice D located in between the anode structure 14 and cathode structure 16. In the present embodiment of the EPID 10 the interstice D between the anode structure 14 and cathode structure 16 is typically 0.007 inches or less. However, it should be understood that the present invention filling method can be applied to any EPID regardless to the size of the spacing in between its anode and cathode.

Figure 2A:
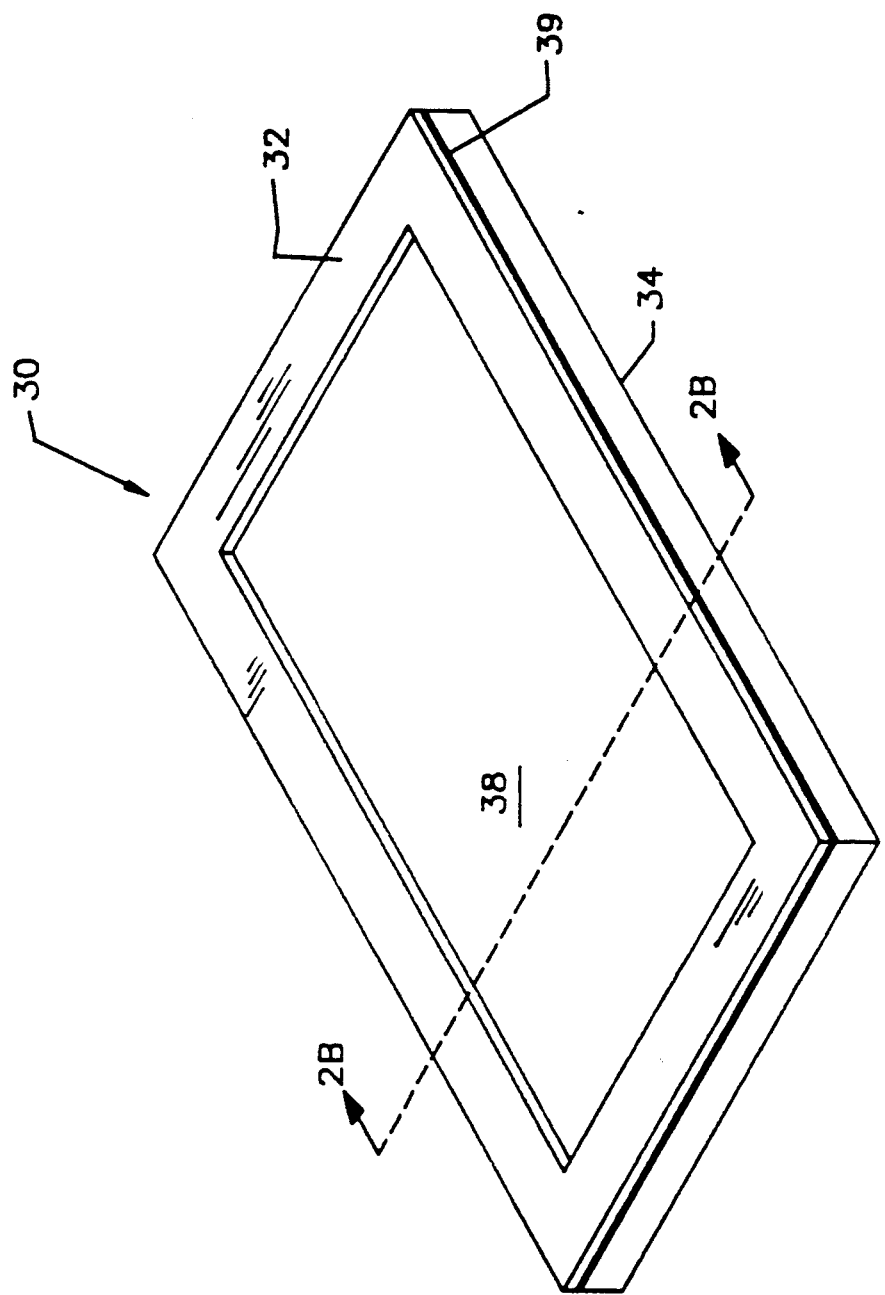
FIG. 2A is a top view of one preferred embodiment of a fixture used in the present invention method.

Referring to FIGS. 2A and 2B, a fixture 30 is shown for use in coating either the cathode structure 16 or the anode structure 14 of EPID 10 with pigment particles 22. The fixture 30 is formed from a continuous dielectric material 32, such as MYLAR or a similar fluid impervious material, being placed around the periphery of a sheet of glass 34 that is coated with a layer 39 of indium-tin-oxide (ITO). The material 32 forms a frame for the ITO coated glass sheet 34. As a result of the placement of the dielectric material 32, only an inner region 38 of the ITO coating 39 is exposed. The dielectric material 32 creates a substantially fluid impervious seal against the ITO coating 39. As such the inner region 38 defined by the dielectric material 32 becomes a fluid reservoir. The dielectric material 32 used to define the inner region 38 is at least 0.007 inches thick, and is preferably approximately 0.014 inches thick. In any event, their dimensions may vary accordingly. Consequently, the inner region 38 defined by the dielectric material 32 can retain fluid to a depth of between 0.007 inches and 0.014 inches, depending upon the thickness of the dielectric material 32 used. Furthermore, the size of the inner region 38 defined by the dielectric material 32 is formed to be at least as large as the image area of the EPID to be filled.

It should be understood that the use of a dielectric material 32, such as MYLAR, upon the ITO coated glass 34 is merely exemplary, and functional equivalents may be used. More specifically, in forming the fixture 30, various conductive substrates can be used in place instead of the ITO coated glass 34. Similarly, other dielectric materials could be used in place and stead of MYLAR, provided the dielectric materials forms a substantially fluid impervious seal against the below lying conductor substrate.

Figure 3:
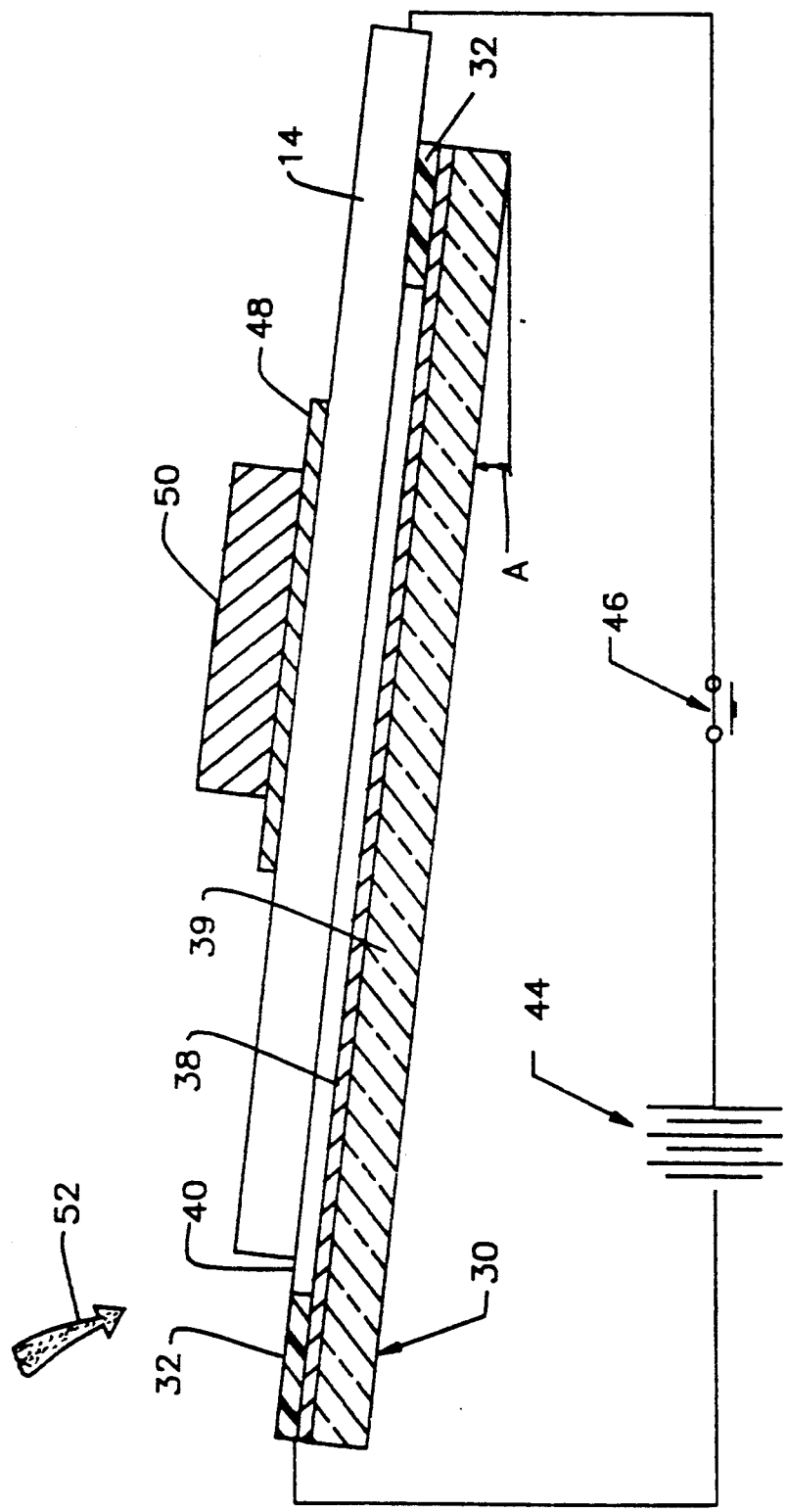
FIG. 3 is a cross-sectional view of an anode structure of an EPID positioned within the fixture illustrated by FIG. 2A to facilitate the present invention method.
Figure 4:
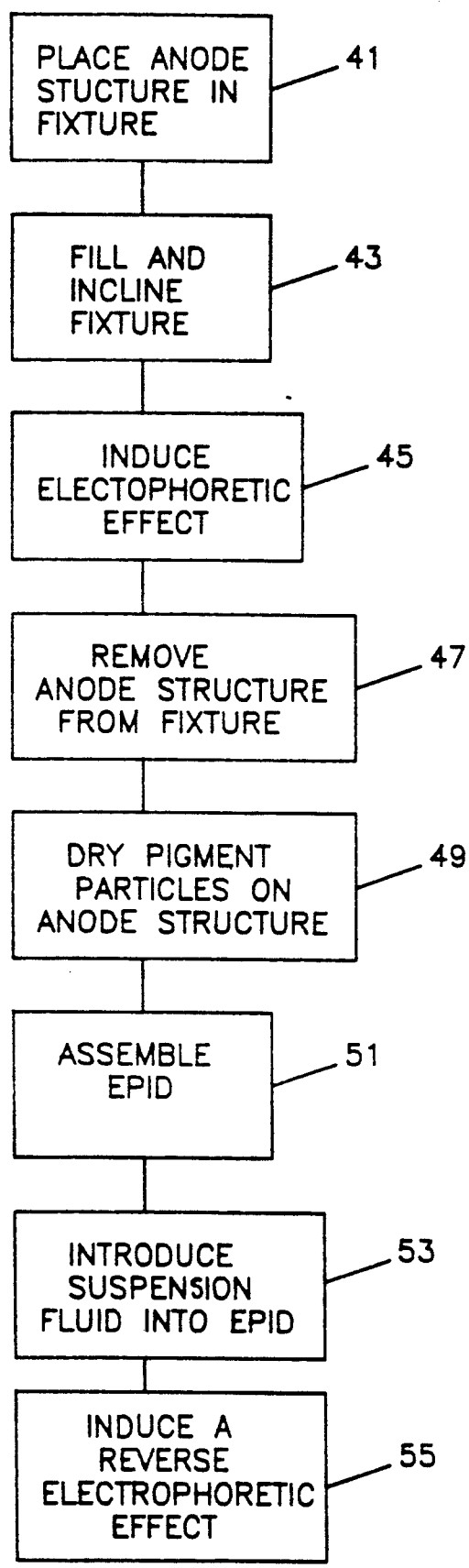
FIG. 4 is a flow chart illustrating the present invention method.

When manufacturing the EPID 10 of FIG. 1 the anode structure 14, prior to assembly into the EPID 10, is placed atop the fixture 30. Referring now to FIG. 3, in conjunction with the flow chart expressed in FIG. 4, the present injunction method can be described. In FIG. 3 the anode structure 14 is shown atop the fixture 30. The fixture 30 is angled above the horizontal by an angle of inclination A. As indicated by block 41, the anode structure 14 is placed atop the fixture 30 so that the area of the anode structure 14 corresponding to the image area of the EPID 10 is above the inner region 38 defined by the dielectric material 32. Additionally, the anode structure 14 is positioned atop the fixture 30 in such a manner so that the anode structure 14 does not completely cover the inner region 38 defined by the dielectric material 32 and an opening 40 exists through which the inner region 38 can be accessed below the anode structure 14. The fixture 30 is angled so that the opening 40 occurs adjacent the most elevated edge of the anode structure 14.

As shown in FIG. 3, the ITO layer 39 of the fixture's glass substrate 17 is coupled to the negative terminal of a power supply 44. Similarly, the anode structure 14 is coupled to the positive terminal of the same power supply 44. The circuit between the ITO layer 39 and the anode structure 14 remains open because the dielectric material 32 separates the anode structure 14 from the ITO layer 39, electrically isolating both components. Additionally, a switch 46 may be placed in the circuit to control the flow of electricity from the power supply 44.

In the shown embodiment a metal plate 48 is placed atop the anode structure 14 on the surface facing away from the fixture 30 and is taped or otherwise removably adhered to the anode structure 14. A magnet 50 is then placed atop the metal plate 48 to serve as a holder. The metal plate 48 and magnet 50 act as a handle means to help in the manipulation of the anode structure 14 to and from the fixture 30. It should also be understood that any other handle means may be used provided the handle means does not compromise the integrity of the anode structure 14.

With the switch 46 turned to the "off" position, a dispersion of pigment particles and suspension fluid are introduced into the opening 40 as indicated by arrow 52. The introduction of the dispersion, expressed by block 43 of the flow chart, is made utilizing a pipette or other similar controlled fluid distributing device. During the introduction of the dispersion through the opening 40, the fixture 30 should be inclined at an angle of approximately twenty degrees with the horizontal. As a result of the angle of inclination A, the dispersion introduced through the opening fills the inner region 38 under the anode structure 14 as defined by the confines of the dielectric material 32. The inner region 38 consequently fills with the dispersion being confined by the anode structure 14 on the top, the ITO layer 39 on the bottom and the dielectric material 32 at the sides.

Once the inner region 38 is completely filled with the dispersion the switch 46 is turned to the "on" position. As a result, the ITO layer 39 is held at a negative potential and the anode structure 14 is held at a positive potential. In the preferred embodiment the power supply 44 should supply a voltage of approximately two hundred and thirty volts. As a result of the electrical potential supplied to both the ITO layer 39 and the anode structure 14, an electrophoretic effect is induced within the inner region 38 below the anode structure 14. The electrophoretic effect, as indicated by block 45 in the flow chart, thereby causes the pigment particles within the dispersion to migrate to the anode structure 14.

After the initial thirty seconds or so of the induced electrophoretic effect, the angle of inclination A is increased to between 45 degrees and 90 degrees, depending upon the depth of the inner region 38. For instance, if the dielectric material 32 used is 0.014 inches deep, the fixture 30 need only be inclined to an angle of 45 degrees to ensure the flow of fluid out of inner region 38. However, if the dielectric material 32 used is 0.007 inches thick and the inner region 38 is only 0.007 inches deep, the fixture 30 may be inclined to an angle of 90 degrees to ensure the flow of fluid out of inner region 38. Once inclined at the appropriate angle, the electrophoretic effect is allowed to continue in the inclined position for a predetermined period of time, which is preferably about thirty minutes.

After the thirty minute period has elapsed, the angle of inclination A is again reduced to approximately 20 degrees and the switch 46 is turned to the "off" position thereby ending the electrophoretic effect. At this point, as indicated by block 47, the anode structure 14 can be removed from the fixture by manipulating the magnet handle 50 on the anode structure 14. The effect of the electrophoretic effect on the anode structure 14 while within the fixture 30 is to coat the surface of the anode structure 14 that contacted the inner region 38 with pigment particles. When the anode structure 14 is removed from the fixture 30, the pigment particles remain adhered to the anode structure 14. If the pigment particles are not completely dry on the anode structure 14, the anode structure 14 should be left in a horizontal position until the fluid has completely evaporated, as indicated by block 49.

Once the pigment particles have been dried on the anode structure 14, the anode structure 14 is assembled into a EPID such as EPID 10 in FIG. 1. The assembled EPID is lacking suspension fluid and fill holes are left in the construction of the EPID for that purpose. Once assembled, as indicated by block 51, the EPID 10 is placed in a vacuum chamber. The pressure within the vacuum chamber is then reduced and the EPID 10 is submerged within a volume of a suspension fluid. The pressure within the vacuum chamber is then slowly raised to ambient pressure causing the suspension fluid to fill the EPID 10 as indicated by block 53. The fill holes used to fill the EPID 10 with suspension fluid are then closed and an appropriate voltage, as indicated by block 55, is applied to the anode structure 14 and the cathode structure 16 of the EPID 10. The voltage applied creates an opposite electrophoretic effect thereby causing the pigment particles to leave the anode structure and become dispersed within the suspension fluid.

By coating the anode structure 14 with pigment particles prior to the assembly of the EPID 10, the EPID 10 can be manufactured having any anode to cathode spacing without concern for achieving a proper pigment particle concentration upon the application of a dispersion medium. Consequently, EPIDs having spacings of below 0.007 inches or even below 0.003 inches can readily be manufactured.

In the described method the anode structure 14 of the EPID was coated with pigment particles. It should be understood by a person skilled in the art that the cathode structure 16 of the EPID 10 could be coated with pigment particles in place and stead of the anode structure 14 by placing the cathode structure 16 into the fixture 30. However, the use of the anode structure 14 is preferred because the anode structure is conventionally less intricate than is a cathode structure and is more readily handled and coupled to the power supply 44.

It will be understood that the method of filling a EPID described herein is merely exemplary and that a person skilled in the art may make many variations and modifications to the described embodiment utilizing functionally equivalent components to those described. More specifically, it should be understood that the fixture 30 described can be formed in any manner, provided it has the ability to retain a small reservoir of fluid and has a base surface that can act as a cathode during an electrophoretic reaction. All such variations and modifications are intended to be included within the scope of the invention as defined by the appended claims.

What is claimed is:

1. A method of filling the interstice between an anode structure and a cathode structure in an electrophoretic image display with a dispersion of pigment particles within a suspension medium, comprising the steps of:
   coating said anode structure with said pigment particles;
   assembling said anode structure into said electrophoretic image display after said step of coating;
   filling said interstice between said anode structure and said cathode structure with said suspension medium; and
   dispersing said pigment particles coating said anode structure into said suspension medium.

2. The method according to claim 1 wherein said step of coating said anode structure includes utilizing said anode structure as an electrode in producing an eletrophoretic effect in a dispersion containing said pigment particles, said electrophoretic effect causing said pigment particles to migrate against, and coat, said anode structure.

3. The method according to claim 2, wherein said step of dispersing said pigment particles includes creating an electrophoretic effect in said electrophoretic image display whereby said pigment particles are caused to migrate toward said cathode structure, thereby leaving said anode structure and becoming disperse in said suspension medium.

4. The method according to claim 3, wherein said interstice between said anode structure and said cathode structure is 0.007 inches or less.

5. A method of filling the interstice between an anode structure and a cathode structure in an cathode structure in an electrophoretic image display with a dispersion of pigment particles within a suspension medium, comprising the steps of:
   coating said anode structure with said pigment particles, said step of coating including positioning said anode structure adjacent a fluid reservoir means opposite a cathode means, filling said reservoir means with a dispersion containing said pigment particles, and applying an electrical potential to said anode structure and said cathode means thereby utilizing said anode structure as an electrode to cause an electrophoretic effect in said dispersion causing said pigment particles migrate toward, and coat, said anode structure;
   assembling said anode structure into said electrophoretic image display;

filling said interstice between said anode structure and said cathode structure with said suspension medium; and dispersing said pigment particles coating said anode structure into said suspension medium by creating an electrophoretic effect in said electrophoretic image display whereby said pigment particles are caused to migrate toward said cathode structure, thereby leaving said anode structure and becoming dispersed in said suspension medium.

6. The method according to claim 5, wherein a voltage differential of approximately 200 volts is applied between said cathode means and said anode structure to cause said electrophoretic effect.

7. The method according to claim 5, wherein said step of positioning said anode structure adjacent a fluid reservoir means includes positioning said anode structure within a fixture whereby the surface of said anode structure, which will face said interstice within said electrophoretic image display, faces said cathode means across said fluid reservoir means.

8. The method according to claim 7 wherein said fluid reservoir means has a depth between said anode structure and said cathode means of between 0.007 inches and 0.014 inches.

9. The method according to claim 7, wherein said fixture includes a filling means through which the dispersion containing said pigment particles can be introduced into said fluid reservoir means.

10. The method according to claim 9, wherein said step of coating said anode structure further includes inclining said fixture relative the horizontal so that said filling means is positioned at the highest point on said fluid reservoir means, said step of inclining helping the dispersion containing said pigment particles to flow into said fluid reservoir means and providing gravity assistance to said pigment particles so that said pigment particles travel throughout said fluid reservoir means and away from said filling means.

11. The method according to claim 10 wherein said fixture is inclined at an angle of between 45 degrees and 90 degrees while said electrophoretic effect is used to coat said anode structure with said pigment particles.

12. A method of filling the interstice between an anode structure and a cathode structure in an electrophoretic image display with a dispersion of pigment particles within a suspension medium, comprising the steps of:

coating said anode structure with said pigment particles;

drying said pigment particles coating said anode structure prior to assembling said anode structure into said electrophoretic image display;

assembling said anode structure into said electrophoretic image display;

filling said interstice between said anode structure said and said cathode structure with said suspension medium; and dispersing said pigment particles coating said anode structure into said suspension medium.

13. A method of filling the interstice between an anode structure and a cathode structure in an electrophoretic image display with a dispersion with pigment particles within a suspension medium, comprising the steps of:

coating said anode structure with said pigment particles by utilizing said anode structure as an electrode in producing an electrophoretic effect in said dispersion containing said pigment particles, said electrophoretic effect causing said pigment particles to migrate against, an coat, said anode structure;

assembling said anode structure into said electrophoretic image display;

filling said interstice between said anode structure and said cathode structure with said suspension medium by submersing said electrophoretic image display in a volume of said suspension medium while in a chamber having a pressure less than ambient and increasing the pressure in said chamber to ambient so that said suspension medium flows into said interstice; and dispersing said pigment particles coating said anode structure into said suspension medium by creating an electrophoretic effect in said electrophoretic image display whereby said pigment particles are caused to migrate toward said cathode structure, thereby leaving said anode structure and becoming dispersed in said suspension medium.

14. A method of dispersing solid particles into a suspension fluid, comprising the steps of coating a conductive surface with said particles; submersing said conductive surface in a volume of said suspension fluid after said step of coating; and creating an electrophoretic effect in said suspension fluid using said conductive surface as an electrode where said particles are caused to migrate away from said conductive surface and therefore become dispersed in said suspension fluid.

15. The method according to claim 14, wherein said step of coating includes positioning said conductive surface within a fluid reservoir means opposite an electrode means whereby said fluid reservoir means separates said conductive surface from said electrode means:

filling said fluid reservoir means with a dispersion containing said pigment particles; and providing an electric potential to said conductive surface and said electrode means inducing an electrophoretic effect in said dispersion whereby said pigment particles are caused to migrate toward, and coat, said conductive surface.

16. The method according to claim 15 wherein said conductive surface is an anode structure for an electrophoretic image display.

17. The method according to claim 15 wherein said conductive surface is a cathode structure for an electrophoretic image display.

18. The method according to claim 15, further including the step of inclining said fluid reservoir means during said electrophoretic effect thereby causing said pigment particles to travel away from their point of entry into the fluid reservoir means and substantially evenly coat said conductive surface.

19. The methods according to claim 15, further including the step of drying said pigment particles on said conductive surface.

20. The method according to claim 19, wherein said step of drying includes positioning said conductive surface coated with said pigment particles in an oven means for a predetermined period of time.

* * * * *